(12) United States Patent
Novis et al.

(10) Patent No.: US 12,217,260 B2
(45) Date of Patent: *Feb. 4, 2025

(54) SYSTEMS AND METHODS FOR AUTOMATED IDENTITY VERIFICATION

(71) Applicant: Capital One Services, LLC, McLean, VA (US)

(72) Inventors: Austen Novis, Jamestown, RI (US); Eric Loucks, Tyson, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,613

(22) Filed: Nov. 7, 2023

(65) Prior Publication Data
US 2024/0144273 A1    May 2, 2024

Related U.S. Application Data

(63) Continuation of application No. 17/981,280, filed on Nov. 4, 2022, now Pat. No. 11,847,584, which is a continuation of application No. 17/458,046, filed on Aug. 26, 2021, now Pat. No. 11,521,209, which is a continuation of application No. 16/849,198, filed on Apr. 15, 2020, now Pat. No. 11,132,685.

(51) Int. Cl.
| | |
|---|---|
| *G06Q 20/40* | (2012.01) |
| *G06F 3/12* | (2006.01) |
| *G06N 5/04* | (2023.01) |
| *G06Q 20/18* | (2012.01) |

(52) U.S. Cl.
CPC ..... *G06Q 20/40145* (2013.01); *G06F 3/1222* (2013.01); *G06F 3/1238* (2013.01); *G06F 3/1243* (2013.01); *G06N 5/04* (2013.01); *G06Q 20/18* (2013.01)

(58) Field of Classification Search
CPC .............. G06Q 20/40145; G06Q 20/18; G06F 3/1222; G06F 3/1238; G06F 3/1243; G06N 5/04
USPC ........................................................ 382/115
See application file for complete search history.

(56) References Cited

U.S. PATENT DOCUMENTS

| | | | |
|---|---|---|---|
| 4,893,338 A | 1/1990 | Pastor | |
| 5,661,803 A | 8/1997 | Cordery et al. | |
| 5,680,455 A | 10/1997 | Linsker et al. | |
| 5,680,456 A | 10/1997 | Baker et al. | |
| 5,812,666 A | 9/1998 | Baker et al. | |
| 6,173,273 B1 | 1/2001 | Herbert | |
| 6,192,473 B1 | 2/2001 | Ryan, Jr. et al. | |
| 6,480,831 B1 | 11/2002 | Cordery et al. | |

(Continued)

*Primary Examiner* — Neil R McLean
(74) *Attorney, Agent, or Firm* — HUNTON ANDREWS KURTH LLP (57) ABSTRACT

A system and method in accordance with examples may include an identity verification kiosk. The identity verification kiosk may include a display comprising a user interface; a card reader; a document scanner; a printer; and a processor in data communication with a server and a database storing user information. The processor may be configured to receive an identification verification request from the user interface; receive user information via the document scanner or the card reader; retrieve user information from the database; verify the identity of a user; and print a unique identifier on a document using the printer.

21 Claims, 4 Drawing Sheets

(56) References Cited

U.S. PATENT DOCUMENTS

| | | |
|---|---|---|
| 6,711,680 B1 | 3/2004 | Cordery |
| 6,868,406 B1 | 3/2005 | Ogg et al. |
| 6,934,839 B1 | 8/2005 | Pagel |
| 7,121,455 B2 | 10/2006 | Chamberlain |
| 7,216,110 B1 | 5/2007 | Ogg et al. |
| 7,225,166 B2 | 5/2007 | Brookner et al. |
| 7,226,494 B1 | 6/2007 | Schwartz et al. |
| 7,236,956 B1 | 6/2007 | Ogg et al. |
| 7,266,696 B2 | 9/2007 | Chamberlain |
| 7,613,660 B2 | 11/2009 | Pintsov |
| 7,849,317 B2 | 12/2010 | Euchner et al. |
| 8,046,311 B2 | 10/2011 | Ferraro et al. |
| 8,375,216 B2 | 2/2013 | Mizuno |
| 8,676,715 B2 | 3/2014 | Cordery et al. |
| 10,108,870 B1 | 10/2018 | Schwartz |
| 10,505,741 B1 * | 12/2019 | Conley ................ H04L 63/123 |
| 2004/0220890 A1 | 11/2004 | Boden |
| 2005/0102499 A1 | 5/2005 | Kosuga et al. |
| 2006/0179317 A1 | 8/2006 | Soumiya et al. |
| 2008/0028455 A1 | 1/2008 | Hatter et al. |
| 2008/0109359 A1 | 5/2008 | Meyer et al. |
| 2013/0297943 A1 * | 11/2013 | Hackler ................ H04L 9/3247 |
| | | 713/178 |
| 2019/0212955 A1 | 7/2019 | Gutierrez et al. |
| 2019/0319948 A1 | 10/2019 | Triola et al. |

* cited by examiner

SYSTEMS AND METHODS FOR AUTOMATED IDENTITY VERIFICATION

CROSS-REFERENCE TO RELATED APPLICATIONS

This application is a continuation of U.S. patent application Ser. No. 17/981,280 filed Nov. 4, 2022, which is a continuation of U.S. patent application Ser. No. 17/458,046 filed Aug. 26, 2021, now U.S. Pat. No. 11,521,209, which is a continuation of U.S. patent application Ser. No. 16/849,198 filed Apr. 15, 2020, now U.S. Pat. No. 11,132,685, the complete disclosures of which are incorporated herein by reference in their entireties.

FIELD OF THE DISCLOSURE

The present disclosure relates to systems and methods for automated identity verification.

BACKGROUND

Notarizing documents include interaction with a notary or a post office. In addition, interaction with an institution is needed to print a cashier check. While these transactions are frequently used in many fields associated with a variety of users, both transactions are often separately processed, involve numerous applications, are susceptible to security concerns such as forgery, and are subject to delay in processing.

These and other deficiencies exist. Accordingly, there is a need to provide users with an appropriate solution that overcomes these deficiencies which provides increased security, more efficient processing, and enhanced user interaction experience.

SUMMARY OF THE DISCLOSURE

Embodiments of the present disclosure provide an identity verification kiosk comprising: a display comprising a user interface; a card reader; a document scanner; a printer; and a processor in data communication with a server and a database storing user information. The processor may be configured to receive an identification verification request from the user interface; receive user information via the document scanner or the card reader; retrieve user information from the database; verify the identity of a user; and print a unique identifier on a document using the printer.

Embodiments of the present disclosure provide a kiosk for printing guaranteed funds checks comprising: a display presenting a user interface; a card reader; a document scanner; a printer; and a processor in data communication with a database containing user information and user account information. The processor may be configured to receive a guaranteed funds check request from the user interface; request user information from a user using the user interface; receive user information from one or more of the user interface, document scanner, or card reader; verify the identity of a user; receive user account information from the database; and upon determining the presence of sufficient funds in a user account, print a guaranteed funds check comprising a unique identifier using the printer.

Embodiments of the present disclosure provide a method for recording confirmation of a user identity. The method may comprise receiving an identification verification request from a user; scanning one or more identification documents; collecting identification information associated with the user; collecting live biometric data associated with the user; verifying the identity of the user; scanning a document to be witnessed; and witnessing the document by marking the document with a unique identifier.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

As described herein, systems, such as a kiosk or automated teller machine may be configured to verify identity of a user through, for example a driver's license, passport, biometrics. Image recognition may be performed by the kiosk to ensure that identification documents are indeed authentic. Once the determination is made that the documents are in fact authentic, the kiosk may determine one or more locations on the pages where a unique signature is to be signed and on the documents. Moreover, the kiosk may be used to print out cashier checks with a unique signature after verification of user identity.

Figure 1A:
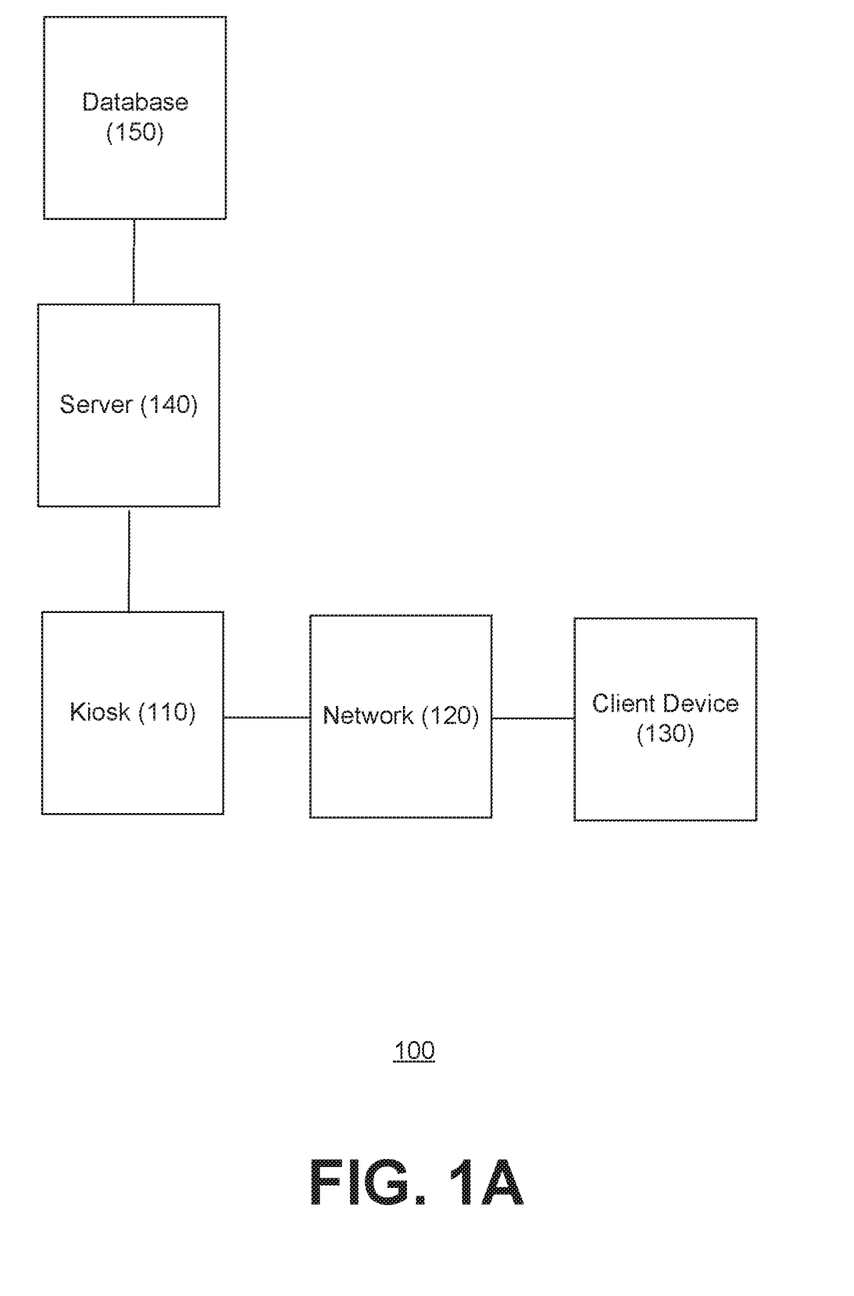
FIG. 1A depicts a system according to an exemplary embodiment.

FIG. 1A illustrates a system 100 according to an exemplary embodiment. As further discussed below, system 100 may include an identity verification kiosk 110; a network 120; a client device 130; a server 140; and a database 150. Although FIG. 1A illustrates single instances of components of system 100, system 100 may include any number of components.

System 100 may include an identity verification kiosk 110. The identity verification kiosk 110 is explained in further detail with reference to FIG. 1B.

System 100 may include a network 120. In some examples, network 120 may be one or more of a wireless network, a wired network or any combination of wireless network and wired network, and may be configured to connect to any one of components of system 100. For example, client device 130 may be configured to connect to kiosk 110 via network 120. In some examples, network 120 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 may include, without limitation, telephone lines, fiber optics, IEEE Ethernet 902.3, a wide area network, a wireless personal area network, a LAN, or a global network such as the Internet. In addition, network 120 may support an Internet network, a wireless communication network, a cellular network, or the like, or any combination thereof Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

System 100 may include a client device 130. For example, client device 130, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 130 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 130 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 130 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 130 may execute one or more applications, such as software applications, that enable, for example, network communications with one or more components of system 100 and transmit and/or receive data.

Client device 130 may be in communication with kiosk 110, one or more servers 140 via one or more networks 120, and may operate as a respective front-end to back-end pair with server 140. Client device 130 may transmit, for example from a mobile device application executing on client device 130, one or more requests to kiosk 110. The one or more requests may be associated with retrieving data from kiosk 110 or server 140. Kiosk 110 or server 140 may receive the one or more requests from client device 130. Based on the one or more requests from client device 130, kiosk 110 or server 140 may be configured to retrieve the requested data from one or more databases 150. Based on receipt of the requested data from the one or more databases 150, kiosk 110 or server 140 may be configured to transmit the received data to client device 130, the received data being responsive to one or more requests.

System 100 may include one or more servers 140. In some examples, server 140 may include one or more processors, which are coupled to memory. Server 140 may be configured as a central system, server or platform to control and call various data at different times to execute a plurality of workflow actions. Server 140 may be configured to connect to the one or more of kiosk 110, client device 130, and database 150.

System 100 may include a database 150. As explained above database 150 may be called to retrieve data including user information. The data may be requested by kiosk 110 or server 140 or client device 130. In some examples, database 150 may be configured to communicate with one or more components of system.

Figure 1B:
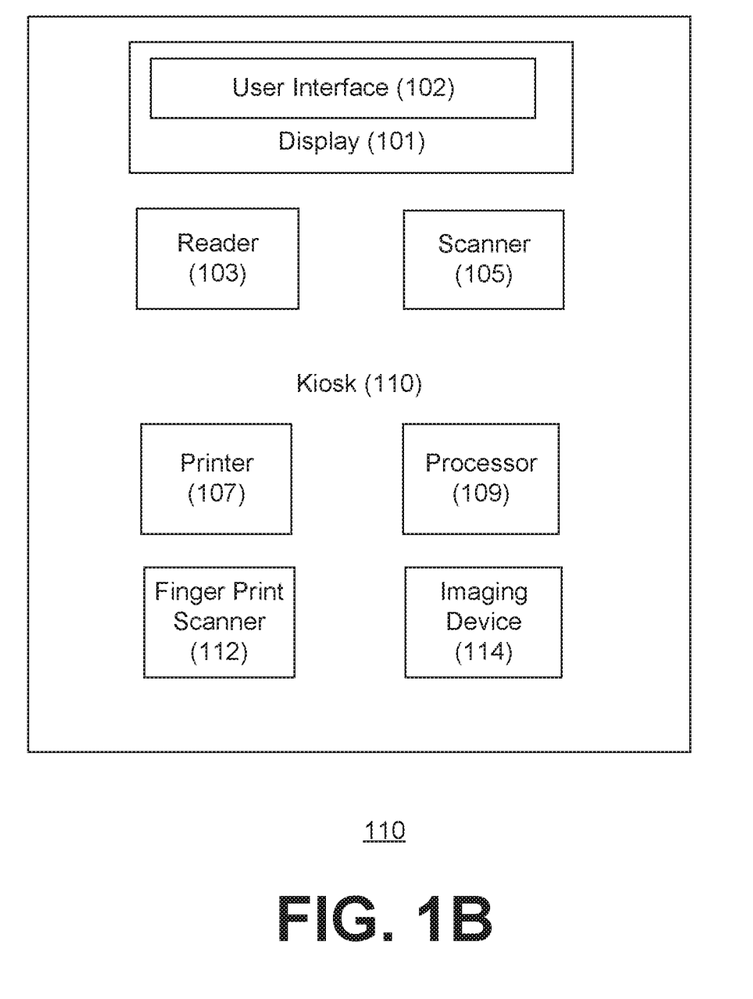
FIG. 1B depicts a kiosk according to an exemplary embodiment.

FIG. 1B illustrates a kiosk 110 according to an exemplary embodiment. The kiosk 110 may include kiosk 110 from FIG. 1A. The kiosk 110 may comprise a display 101; a reader 103; a scanner 105; a printer 107; and a processor 109.

The display 101 may comprise a user interface 102. In some examples, one or more requests from the user interface 102 may be transmitted to processor 109. For example, the processor 109 may be configured to receive an identification verification request that is transmitted from the user interface 102.

The reader 103 may comprise a card reader. In some examples, reader 103 may be configured to read and transmit data to processor 109. For example, the processor 109 may be configured to receive user information via the card reader 103.

The scanner 105 may comprise a document scanner. The document scanner may be configured to read and transmit data to processor 109. For example, the processor 109 may be configured to receive user information via the document scanner 105. In some examples, the document scanner 105 may be configured to scan one or more documents after the printer 107 has printed a unique identifier on the document.

The processor 109 may be in data communication with a server 140 and a database 150 storing information, including but not limited to user information. In some examples, the user information may comprise at least one selected from the group of a first name, last name, date of birth, home address, work address, phone number, e-mail address, social security number, account number, driver's license number, passport number, identification card number, fingerprint identification, facial recognition fingerprint, security challenge questions, and security challenge answers.

In some examples, the processor 109 may be configured to receive one or more requests from the user interface 102. For example, the processor 109 may be configured to receive an identification verification request that is transmitted from the user interface 102. In some examples, the processor 109 may be configured to receive user information via the document scanner 105. In other examples, the processor 109 may be configured to receive user information via the card reader 103. The processor 109 may be configured to retrieve user information from via server 140 and/or the database 150. The processor 109 may be configured to verify the identity of a user. The processor 109 may be configured to output information using one or more components of system 100. For example, the processor 109 may be configured to print a unique identifier on a document using the printer 107. In some examples, after the printer 107 has printed a unique identifier on the document, the document scanner 105 may be configured to scan a document. In some examples, the unique identifier may encode information associated with at least one of date, time, and location that the unique identifier was printed.

In some examples, the kiosk 110 may further comprise a finger print scanner 112. The finger print scanner 112 may be in data communication with the processor. The finger print scanner 112 may be configured to retrieve one or more finger print scans to verify the identity of the user. In some examples, a first set of received one or more finger print scans may be compared by processor 109 to a second set of one or more reference finger print scans stored in database 150 and/or accessible to server 140 to assist in identity verification of the user. In some examples, kiosk 110 may be configured to capture biometric data and compare it with one or more reference biometric data stored in database 150 and/or accessible to server 140 to assist in the identity verification. In some examples, identity verification may be additionally and/or alternatively performed by kiosk 110 based on photo matching associated with an identification card. For example, kiosk 110 may be configured to capture one more images from an identification card and compare it with one or more reference images stored in database 150 and/or accessible to server 140 to assist in the identity verification.

In some examples, the kiosk 110 may further comprise an imaging device 114 configured to gather image data associated with the user. For example, the processor 109 may be configured to receive image data from the imaging device 114 and verify the identity of the user based at least in part on the received image data. The processor 109 may be configured to determine a fingerprint associated with the user. For example, the processor 109 may be configured to determine a real-time or live facial recognition fingerprint associated with the user based on the image data received from the imaging device 114. The processor 109 may be configured to determine one or more fingerprints based on images associated with documents. For example, the processor 109 may be configured to determine one or more identification facial recognition fingerprints based on the one or more images associated with one or more identification documents and verify the identity of the user based in part on comparing the one or more identification facial recognition fingerprints to the live facial recognition fingerprint.

In some examples, the processor 109 may be configured to transmit one or more factors to a device 130. For example, the processor 109 may be configured to transmit a second factor authentication to a mobile device 130 associated with the user. In some examples, the second factor authentication may comprise a request requiring a response from the device 130. For example, the second factor authentication may request input of at least one selected from the group of one or more user credentials and biometric authorization. Upon receipt and determination of authentication of the input transmitted from the device 130, the processor 109 may be configured to proceed with printing the unique identifier on the document using the printer 107. In some examples, the processor 109 may be configured to account for timeout or delays during scanning by requesting additional predetermined time for scan input prior to restarting the scanning process. For example, the processor 109 may be configured to cancel the transaction for security reasons should an error occur during scanning. In some examples, the error may be associated with the user providing insufficient identity verification information, as opposed to an outcome associated with a failure to identify the user. In such a case, the processor 109 may be configured to prompt additional identity verification information. In other examples, the error may be associated with an outcome indicative of the unavailability of the scanning for identity verification.

Figure 2:
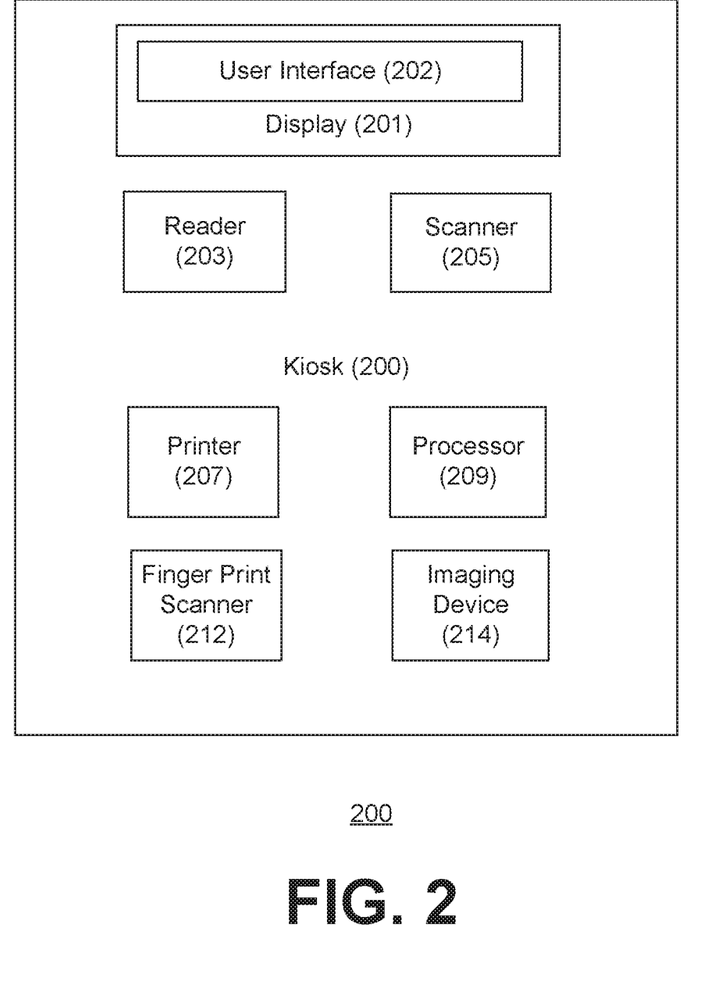
FIG. 2 depicts a kiosk configured to print guaranteed funds checks according to an exemplary embodiment.

FIG. 2 illustrates a kiosk 200 configured to print guaranteed funds checks. Although FIG. 2 illustrates single instances of components of kiosk 200, kiosk 200 may include any number of components. FIG. 2 may reference same or similar components of FIG. 1A and FIG. 1B. The kiosk 200 may comprise a display 201; a reader 203; a scanner 205; a printer 207; and a processor 209.

The display 201 may comprise a user interface 202. In some examples, one or more requests from the user interface 202 may be transmitted to processor 209. For example, the processor 209 may be configured to receive an identification verification request that is transmitted from the user interface 202.

The reader 203 may comprise a card reader. In some examples, reader 203 may be configured to read and transmit data to processor 209. For example, the processor 209 may be configured to receive user information via the card reader 203.

The scanner 205 may comprise a document scanner. The document scanner may be configured to read and transmit data to processor 209. For example, the processor 209 may be configured to receive user information via the document scanner 205. In some examples, the document scanner 205 may be configured to scan one or more documents after the printer 207 has printed a unique identifier on the document.

The processor 209 may be in data communication with a server, such as server 140 and a database, such as database 150, of FIG. 1A storing information, including but not limited to user information and user account information. Without limitation, the user information may comprise at least one selected from the group of a first name, last name, date of birth, home address, work address, phone number, e-mail address, social security number, account number, driver's license number, passport number, identification card number, fingerprint identification, facial recognition fingerprint, security challenge questions, and security challenge answers. Without limitation, the user account information may comprise at least one selected from the group of checking account, savings account, credit card, debit card, account numbers, transaction history, application information, and credit information.

In some examples, the processor 209 may be configured to receive one or more requests from the user interface 202. For example, the processor 209 may be configured to receive a guaranteed funds check request that is transmitted from the user interface 202. In some examples, the processor 209 may be configured to request the user information from a user using the user interface 202. In some examples, the processor may be configured to receive user information from the user interface 209. In some examples, the processor 209 may be configured to receive user information from the document scanner 205. In some examples, the processor may be configured to receive the user information from the card reader 203. The processor 209 may be configured to verify the identity of a user based on authenticated user information.

The processor 209 may be configured to retrieve user account information from a database. The processor 209 may be configured to output information using one or more components of kiosk 200. For example, the processor 209 may be configured to print, upon determining the presence of sufficient funds in a user account, a guaranteed funds check comprising a unique identifier using the printer 207. The printed guaranteed funds check may be responsive to the guaranteed funds check request from the user interface 202. In some examples, the unique identifier may encode information associated with at least one of date, time, and location that the unique identifier was printed.

In some examples, the kiosk 200 may further comprise a finger print scanner 212. The finger print scanner 212 may be in data communication with the processor. The finger print scanner 212 may be configured to retrieve one or more finger print scans to verify the identity of the user. In some examples, a first set of received one or more finger print scans may be compared by processor 209 to a second set of one or more reference finger print scans stored in database and/or accessible to server to assist in identity verification of the user. In some examples, kiosk 200 may be configured to capture biometric data and compare it with one or more reference biometric data stored in a database (similar to database 150) and/or accessible to a server (similar to server 140) to assist in the identity verification. In some examples, identity verification may be additionally and/or alternatively performed by kiosk 200 based on photo matching associated with an identification card. For example, kiosk 200 may be configured to capture one more images from an identification card and compare it with one or more reference images stored in the database and/or accessible to the server to assist in the identity verification.

In some examples, the kiosk 200 may further comprise an imaging device 214 configured to gather image data associated with the user. For example, the processor 209 may be configured to receive image data from the imaging device 214 and verify the identity of the user based at least in part on the received image data. The processor 209 may be configured to determine a fingerprint associated with the user. For example, the processor may be configured to determine a real-time or live facial recognition fingerprint associated with the user based on the image data received from the imaging device 214. The processor 209 may be configured to determine one or more fingerprints based on images associated with documents. For example, the processor 209 may be configured to determine one or more identification facial recognition fingerprints based on the one or more images associated with one or more identification documents and verify the identity of the user based in part on comparing the one or more identification facial recognition fingerprints to the live facial recognition fingerprint.

In some examples, the processor 209 may be configured to transmit one or more factors to a device. For example, the processor may be configured to transmit a second factor authentication to a mobile device associated with the user. In some examples, the second factor authentication may comprise a request requiring a response from the device. For example, the second factor authentication may request input of at least one selected from the group of one or more user credentials and biometric authorization. Upon receipt and determination of authentication of the input transmitted from the device, the processor 209 may be configured to proceed with printing the unique identifier on the document using the printer 207. In some examples, the second factor authentication may be part of verifying identity of the user.

Figure 3:
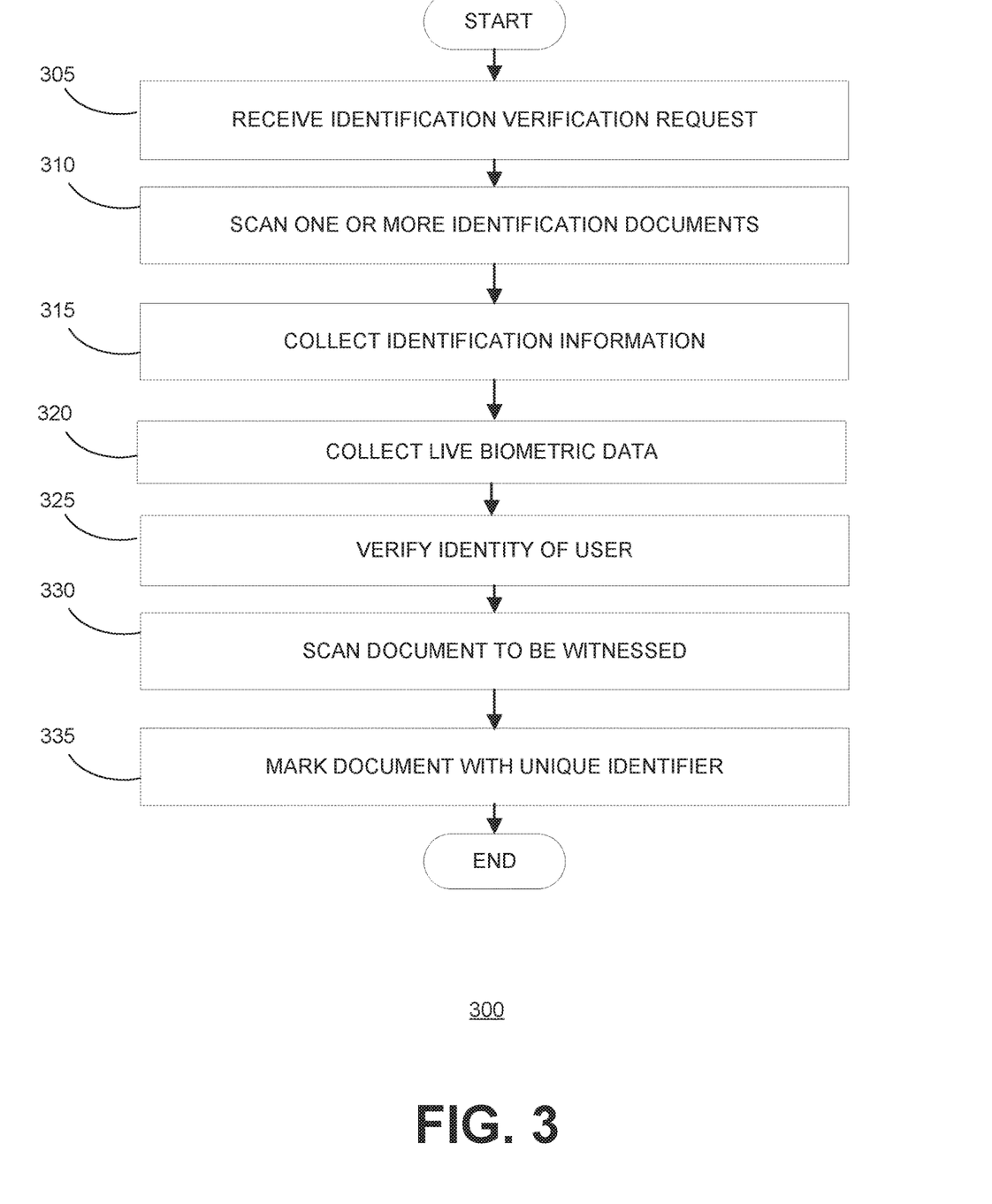
FIG. 3 depicts a method for recording confirmation of a user identity according to an exemplary embodiment.

FIG. 3 illustrates a method 300 for recording confirmation of a user identity. FIG. 3 may reference same or similar components of system 100 of FIG. 1A, kiosk 110 of FIG. 1B, and kiosk 200 of FIG. 2.

At block 305, method may include receiving an identification verification request from a user.

At block 310, method may include scanning one or more identification documents.

At block 315, method may include collecting identification information associated with the user. In some examples, method 300 may further comprise requesting consent from the user to collect identification information or biometric information associated with the user. For example, the kiosk may be configured to transmit a request for consent to the device of the user in order to obtain at least one selected from the group of identification information and biometric information associated with the user.

At block 320, method may include collecting live biometric data associated with the user. In some examples, collecting live biometric data associated with the user may comprise receiving image data associated with a user face and establishing a facial recognition fingerprint based on image data. In some examples, collecting live biometric data associated with the user may comprise recording data associated with one or more fingerprints of the user using a fingerprint scanner.

At block 325, method may include verifying the identity of the user. In some examples, this may include comparison of collected live biometric data with reference data. For example, method 300 may further comprise receiving biometric information associated with the user from an identification document and comparing the document biometric information to the live biometric information. In some examples, method 300 may further comprise comparing the collected identification information associated with the user to previously recorded identification information associated with the user.

At block 330, method may include scanning a document to be witnessed.

At block 335, method may include witnessing the document by marking the scanned document with a unique identifier. For example, the unique identifier may comprise a computer readable image and a timestamp. In some examples, the unique identifier may comprise a non-sequential pseudo-randomly generated identifier. Depending on jurisdictional requirements, notaries for a document may differ from those of certified check. Thus, depending on the document type, one or more selected from the group of the unique identifier, timestamp, stamp or seal, and digital signature may be included for notarization purposes. Method 300 may further comprise receiving information associated with a previously printed unique identifier and determining differences between a previously marked document and the scanned document to be witnessed.

In some examples, method 300 may further comprise applying a predictive model to determine where a document should be marked. For example, the predictive model may be developed by machine learning using at least one algorithm selected from the group of a gradient boosting machine algorithm, a logistic regression algorithm, and a neural network algorithm.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system, comprising:
a processor; and
an imaging device, wherein
the processor receives image data from the imaging device and verifies an identity of a user based at least in part on the received image data,
the processor applies a predictive model to determine a marking location on a document of the user, and
the processor witnesses the document by marking a unique identifier at the marking location.

2. The system of claim 1, further comprising a printer, wherein the printer prints the unique identifier at the marking location.

3. The system of claim 1, wherein the unique identifier encodes information associated with at least one selected from a group consisting of a date the unique identifier was printed, a time the unique identifier was printed, and a location the unique identifier was printed.

4. The system of claim 1, further comprising an input device comprising at least one selected from a group consisting of a document scanner, a card reader, and a fingerprint scanner,
wherein the processor receives user information from the input device, and
wherein the processor compares the received user information to previously received user information stored in a database.

5. The system of claim 1, further comprising a fingerprint scanner, wherein
the processor receives a fingerprint associated with the user from the fingerprint scanner, and
the processor compares the received fingerprint with a previously received fingerprint stored in a database.

6. The system of claim 1, wherein the document comprises at least one selected from a group consisting of a cashier's check and a certified check.

7. The system of claim 1, further comprising a document scanner,
wherein the document scanner scans the document after the printer prints the unique identifier.

8. A non-transitory computer-accessible medium containing executable instructions, wherein, when executed by a computer hardware arrangement comprising a processor and an imaging device, and the computer hardware arrangement is configured to perform procedures comprising:
receiving image data from the imaging device and verifying an identity of a user based at least in part on the received image data,
applying a predictive model to determine a marking location on a document of the user, and
witnessing the document by marking a unique identifier at the marking location.

9. The non-transitory computer-accessible medium of claim 8, wherein the predictive model is developed by machine learning using at least one algorithm selected from a group consisting of a gradient boosting machine algorithm, a logistic regression algorithm, and a neural network algorithm to develop the predictive model.

10. The non-transitory computer-accessible medium of claim 8, wherein the unique identifier comprises a computer-readable image and a timestamp.

11. The non-transitory computer-accessible medium of claim 8, wherein the unique identifier comprises a non-sequential identifier.

12. The non-transitory computer-accessible medium of claim 11, wherein the non-sequential identifier is pseudo-randomly generated.

13. The non-transitory computer-accessible medium of claim 8, the procedures further comprising:
collecting identification information associated with the user; and
collecting live biometric data associated with the user.

14. The non-transitory computer-accessible medium of claim 13, the procedures further comprising:
receiving biometric information associated with the user from an identification document; and
comparing the document biometric information to the live biometric information.

15. The non-transitory computer-accessible medium of claim 13, wherein:
collecting live biometric data comprises receiving image data associated with the user's face, and
the procedures further comprise establishing a facial recognition fingerprint based on the image data associated with the user's face.

16. The non-transitory computer-accessible medium of claim 13, the procedures further comprises requesting a consent from the user to collect the identification information or biometric information associated with the user.

17. The non-transitory computer-accessible medium of claim 8, the procedures further comprises printing the unique identifier at the marking location.

18. A method, comprising:
   receiving, by a processor, image data from an imaging device and verifying an identity of a user based at least in part on the received image data;
   applying, by the processor, a predictive model to determine a marking location on a document of the user; and
   witnessing, by the processor, the document by marking a unique identifier at the marking location.

19. The method of claim 18, further comprising printing, by a printer, a unique identifier at the marking location.

20. The method of claim 18, wherein the unique identifier encodes information associated with at least one selected from a group consisting of a date, a time, and a location the unique identifier was printed.

21. The method of claim 18, further comprising:
   receiving information associated with a previously printed unique identifier; and
   determining a difference between the document and a previously marked document.

\* \* \* \* \*